United States Patent
VanBlon et al.

(10) Patent No.: US 11,307,045 B2
(45) Date of Patent: Apr. 19, 2022

(54) METHOD AND SYSTEM TO DETERMINE NAVIGATION ACTIONS BASED ON INSTRUCTIONS FROM A DIRECTIONAL DIALOGUE

(71) Applicant: Lenovo (Singapore) Pte. Ltd., New Tech Park (SG)

(72) Inventors: Russell Speight VanBlon, Raleigh, NC (US); Timothy Winthrop Kingsbury, Cary, NC (US); Scott Wentao Li, Cary, NC (US); Robert James Kapinos, Durham, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 117 days.

(21) Appl. No.: 16/720,336

(22) Filed: Dec. 19, 2019

(65) Prior Publication Data
US 2021/0190527 A1    Jun. 24, 2021

(51) Int. Cl.
*G01C 21/36* (2006.01)

(52) U.S. Cl.
CPC ..... *G01C 21/3608* (2013.01); *G01C 21/3623* (2013.01)

(58) Field of Classification Search
CPC .................................................. G01C 21/3608
See application file for complete search history.

(56) References Cited

U.S. PATENT DOCUMENTS

| | | | | |
|---|---|---|---|---|
| 6,570,555 | B1* | 5/2003 | Prevost | G06F 3/038 345/156 |
| 6,674,424 | B1* | 1/2004 | Fujioka | G06F 3/0428 345/157 |
| 10,013,878 | B2* | 7/2018 | Ricci | H04N 21/2265 |
| 2013/0298026 | A1* | 11/2013 | Fitzpatrick | H04N 21/41265 715/723 |
| 2014/0148988 | A1* | 5/2014 | Lathrop | B60W 30/182 701/1 |
| 2018/0239351 | A1* | 8/2018 | Liang | G05D 1/0274 |
| 2018/0239352 | A1* | 8/2018 | Wang | B60W 60/0053 |
| 2019/0094038 | A1* | 3/2019 | Oh | B60R 16/0373 |
| 2019/0103027 | A1* | 4/2019 | Wheeler | B60K 37/06 |
| 2019/0265703 | A1* | 8/2019 | Hicok | G05D 1/0242 |

FOREIGN PATENT DOCUMENTS

CN         102081403 B   * 12/2012

* cited by examiner

*Primary Examiner* — Jean Paul Cass
(74) *Attorney, Agent, or Firm* — The Small Patent Law Group LLC; Dean D. Small

(57) ABSTRACT

A computer implemented method, system and computer program product are provided that obtain a directional dialogue comprising a series of instructions that at least partially defines a pathway through an environment, determine navigation actions associated with the pathway based on the series of instructions, track movement of an electronic device (ED) based on one or more of GPS data and non-GPS data; and present the navigation actions based on the movement.

19 Claims, 4 Drawing Sheets

METHOD AND SYSTEM TO DETERMINE NAVIGATION ACTIONS BASED ON INSTRUCTIONS FROM A DIRECTIONAL DIALOGUE

BACKGROUND

Embodiments of the present disclosure generally relate to converting verbal instructions to automated navigation actions.

Today, electronic devices (e.g., cellular phones, tablet devices, laptop computers) support location services that allow a user to enter a destination, automatically calculate a route from a current location to the destination and then provide turn by turn instructions to the user while navigating to the destination. To provide the location service, the electronic devices utilize an internal tracking system, such as a GPS chip set, to periodically broadcast the geographic location of the electronic device to a remote server. The remote server and/or the local electronic devices calculate the route and then provide the turn by turn instructions.

However, in some instances, the user may seek a destination that is not searchable through a GPS based navigation network. For example, the user may be within a building, office complex, city neighborhood and the like, for which no detailed GPS map information has been collected. For example, the user may need directions from an office building lobby or cubicle to a conference room, restroom, office, other cubicle and the like. Also, whether inside of a building or in a remote area, the electronic device may not have cellular or wireless coverage and therefore may not be able to utilize a GPS based navigation system to collect and track GPS data. Therefore, often, a user is forced to ask directions from individuals familiar with the area. The user either memorizes the instructions or writes down the instructions. Based on the verbal instructions, when navigating to the destination, the user is either required to recall from memory each turn by turn direction and/or repeatedly reference handwritten notes. Also, the user may not understand or misunderstand certain instructions (e.g. Did he say turn left or turn right at the next intersection, I thought she said to turn right at the third corridor).

A need remains for an improved manner do utilize verbal instructions in connection with navigation.

SUMMARY

In accordance with embodiments herein a computer implemented method is provided that comprises: under the direction of one or more processors, obtaining a directional dialogue comprising a series of instructions that at least partially defines a pathway through an environment; determining navigation actions associated with the pathway based on the series of instructions; tracking movement of an electronic device (ED) based on one or more of GPS data and non-GPS data; and presenting the navigation actions based on the movement.

Additionally or alternatively, in accordance with aspects herein, the determining comprises identifying a present location of the ED along the pathway based on the movement and, based on the present location, identifying a corresponding one of the navigation actions. Additionally or alternatively, in accordance with aspects herein, the obtaining comprises recording the directional dialogue as an audio recording and parsing the audio recording to identify segments associated with verbal instructions that at least partially define the pathway. Additionally or alternatively, in accordance with aspects herein, the obtaining comprises recording the directional dialogue as a video recording and parsing the video recording to identify segments associated with gesture-based instructions that at least partially define the pathway. Additionally or alternatively, in accordance with aspects herein, the obtaining comprises recording the directional dialogue as audio and video recordings, parsing the audio and video recordings to identify segments associated with verbal and gesture-based instructions, identifying a combination of a verbal based instruction and a gesture-based instruction that collectively define a single navigation action.

Additionally or alternatively, in accordance with aspects herein, the determining the navigation actions further comprises comparing one or more of verbal and gesture-based instructions in the directional dialogue to one or more of a template and a machine learning-based model to identify the corresponding navigation action. Additionally or alternatively, in accordance with aspects herein, the directional dialogue comprises verbal statements corresponding to the series of instructions, the presenting comprises replaying a select one of the verbal statements as the navigation action.

Additionally or alternatively, in accordance with aspects herein, the presenting comprises displaying an augmented reality view of the environment in combination with one or more of an audible, visual and tactile output indicative of the navigation action. Additionally or alternatively, in accordance with aspects herein, the tracking comprises one or more of: a) collecting the GPS data indicative of a present location of the ED and analyzing the GPS data with respect to when to present the corresponding navigation action; and b) collecting ERDC data from the ED indicative of a feature of interest from the environment and analyzing the ERDC data with respect to when to present the corresponding navigation action.

In accordance with embodiments herein, the system is provided that comprises: a user interface; a processor; a memory storing program instructions accessible by the processor, wherein, responsive to execution of the program instructions, the processor to perform the following: obtain a directional dialogue comprising a series of instructions that at least partially defines a pathway through an environment; determine navigation actions associated with the pathway based on the series of instructions; track movement of an electronic device (ED) based on one or more of GPS data and non-GPS data; and present the navigation actions based on the movement.

Additionally or alternatively, in accordance with aspects herein, responsive to execution of the program instructions, the processor to identify a present location of the ED along the pathway based on the movement and, based on the present location, identify a corresponding one of the navigation actions. Additionally or alternatively, in accordance with aspects herein, responsive to execution of the program instructions, the processor to record the directional dialogue as an audio recording and parsing the audio recording to identify segments associated with verbal instructions that at least partially define the pathway. Additionally or alternatively, in accordance with aspects herein, responsive to execution of the program instructions, the processor to record the directional dialogue as a video recording and parsing the video recording to identify segments associated with gesture-based instructions that at least partially define the pathway. Additionally or alternatively, in accordance with aspects herein, responsive to execution of the program instructions, the processor to record the directional dialogue as audio and video recordings, parsing the audio and video recordings to identify segments associated with verbal and gesture-based instructions, identifying a combination of a verbal based instruction and a gesture-based instruction that collectively define a single navigation action.

Additionally or alternatively, in accordance with aspects herein, responsive to execution of the program instructions, the processor to determine the navigation actions by comparing one or more of verbal and gesture-based instructions in the directional dialogue to one or more of a template and a machine learning-based model to identify the corresponding navigation action.

Additionally or alternatively, in accordance with aspects herein the ED represents a first ED having one or more of a microphone and camera that, under direction of a first processor, obtains the directional dialogue, the system further comprising one or more of a second ED and a remote server, having a second processor, to perform one or more of the determining the navigation actions, tracking the movement and presenting the navigation actions based on the movement.

In accordance with embodiments herein, a computer program product is provided comprising a non-signal computer readable storage medium comprising computer executable code to perform: obtaining a directional dialogue comprising a series of instructions that at least partially defines a pathway through an environment; determining navigation actions associated with the pathway based on the series of instructions; tracking movement of an electronic device (ED) based on one or more of GPS data and non-GPS data; and presenting the navigation actions based on the movement.

Additionally or alternatively, in accordance with aspects herein, the determining comprises identifying a present location of the ED along the pathway based on the movement and, based on the present location, identifying a corresponding one of the navigation actions. In accordance with aspects herein, the computer program product further comprises a navigation log to record timestamps, verbal-based instructions, gesture-based instructions, and navigation actions associated with the verbal-based instructions and gesture-based instructions.

DETAILED DESCRIPTION

Figure 1:
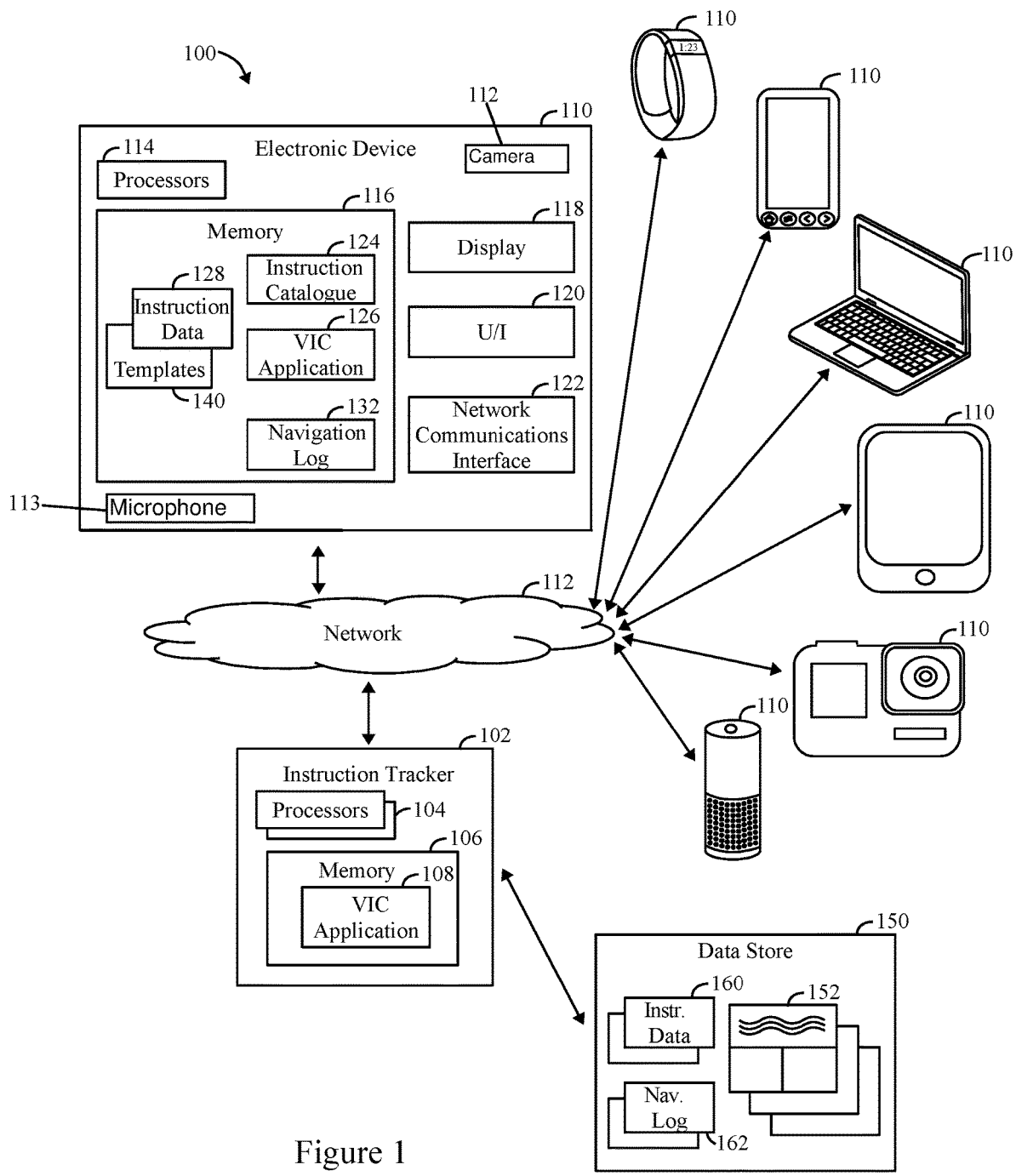
FIG. 1 illustrates a system that collects and converts verbal instructions to navigation actions in accordance with embodiments herein.

It will be readily understood that the components of the embodiments as generally described and illustrated in the Figures herein, may be arranged and designed in a wide variety of different configurations in addition to the described example embodiments. Thus, the following more detailed description of the example embodiments, as represented in the Figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

In accordance with embodiments herein, methods, devices and computer program products are provided that enhance navigation through an environment based on a collection of verbal instructions within a directional dialogue provided by third-party. For example, an individual may ask someone else for verbal directions to a location. But for unique aspects herein, the individual asking for directions may misunderstand or incorrectly follow the directions. In accordance with new and unique aspects herein, a directional dialogue may be recorded, segmented into verbal and/or gesture-based instructions that are then combined with navigation tools to provide reliable navigation assistance along a pathway through an environment. Embodiments herein allow directional instructions to be paired with an indoor navigation system. As one nonlimiting example, a user may utilize an augmented reality feature in a phone, smart glasses or the like to access an indoor environment and obtain detailed navigation that closely follows instructions from a previously received directional dialogue. Hallways, doors interns can be recognized and highlighted as they are encountered in real time in the real world. In connection with external environments, a directional dialogue can be paired with a GPS enabled device to provide accurate navigation. For example, the GPS device may utilize awareness of mapping data to count side roads as such roads are passed and to indicate a correct location for turns and other navigation actions.

FIG. 1 illustrates a system 100 that collects and converts verbal and/or gesture-based instructions to navigation actions in accordance with embodiments herein. In general, a navigation action differs from verbal and gesture-based instructions in that the navigation action represents a computer-generated action that is associated with a physical position within an environment being tracked by an electronic device. For example, a navigation action may be defined as a graphic on a display, augmented reality glasses and the like, where the graphic indicates a path to follow, a direction to turn and the like. As another example, the navigation action may be defined as a computer-generated statement to be replayed by an electronic device, where the computer-generated statement indicates the action to be taken. Computer-generated statements are typically much easier to understand, as compared to verbal instructions provided by an individual. As another example, a computer-generated statement may be in a different language, dialect and the like, as compared to the originally recorded directional dialogue.

The system 100 includes one or more of the illustrated electronic devices 110 that may be utilized to collect the verbal instructions individually or in combination with one another, and/or to provide navigation actions associated with a pathway. The electronic devices 110 communicate with one another wirelessly through network 112. Optionally, the electronic devices 110 may communicate through a wholly or partially wired subsystem. The network 112 may represent the World Wide Web, a local area network, a wide area network and the like. The electronic devices 110 may represent various types of electronic devices including, but not limited to, smart phones, desktop or laptop computers, tablet devices, smart TVs, fixed cameras, portable or handheld cameras, recording devices, digital personal assistant (DPA) devices and the like. In addition, the electronic devices 110 may represent various types of devices configured to record audio and/or voice signatures, detect gestures and movements and the like.

At least one of the electronic devices 110 may be configured to collect and/or convert verbal instructions in accordance with embodiments herein. The electronic device 110 that is configured to implement verbal instruction collection and/or conversion includes one or more processors 114, memory 116, a display 118, a user interface 120, a network communications interface 122, and various other mechanical components, electrical circuits, hardware and software to support operation of the client device 110. It is recognized that not all electronic devices 110 include a display, user interface, and the like. For example, a fixed or handheld camera may simply include camera related electronics and network circuitry to support communication to and from the camera.

The user interface 120 may include a variety of visual, audio, and/or mechanical devices. For example, the user interface 120 can include a visual input device such as an optical sensor or camera, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. Similarly, the user interface 120 can include a visual output device such as a liquid crystal display screen, one or more light emitting diode indicators, an audio output device such as a speaker, alarm and/or buzzer, and a mechanical output device such as a vibrating mechanism. The display may be touch sensitive to various types of touch and gestures. As further examples, the user interface 120 may include a touch sensitive screen, a non-touch sensitive screen, a text-only display, a smart phone display, an audio output (e.g., a speaker or headphone jack), and/or any combination thereof. The user interface 120 permits the user to select one or more of a switch, button or icon in connection with various operations of the device 110.

The memory 116 can encompass one or more memory devices of any of a variety of forms (e.g., read only memory, random access memory, static random access memory, dynamic random access memory, etc.) and can be used by the processor 114 to store and retrieve data. The data that is stored by the memory 116 can include, but need not be limited to, operating systems, applications, and other information. Each operating system includes executable code that controls basic functions of the communication device, such as interaction among the various components, communication with external devices via a wireless transceivers and/or component interface, and storage and retrieval of applications and data to and from the memory 116. Each application includes executable code that utilizes an operating system to provide more specific functionality for the communication devices, such as file system service and handling of protected and unprotected data stored in the memory 116.

The network communications interface 122 provides a direct connection to other devices, auxiliary components, or accessories for additional or enhanced functionality, and in particular, can include a USB port for linking to a user device with a USB cable. Optionally, the network communications interface 122 may include one or more transceivers that utilize a known wireless technology for communication.

The electronic device 110 includes one or more cameras 112 and microphone 113. The cameras 112 are configured to capture still and/or video data regarding an environment surrounding the electronic device, including, but not limited to, gesture-based instructions from a third-party providing directional dialogue. The microphone 113 is configured to capture audio data regarding the environment surrounding the electronic device including, but not limited to, verbal-based instructions from the third-party when providing directional dialogue. For example, a user may activate the cameras 112 and microphone 113 before or while the user is asking a third-party for directions. Optionally, the same cameras 112 and microphone 113 may be utilized throughout navigation to collect additional audio, image and video data regarding the environment surrounding the electronic device as environment related device captured (ERDC) data. The ERDC data may be used during navigation to track the present location of the user and collect movement information, such as when GPS functionality is not available.

By way of example, the ERDC data may represent a designation for a destination within the environment, such as a designation for a conference room (e.g., name, number or location), doorway, entry area, hall way, interior common area, office, meeting area, cubicle, exit, restroom, stairway, elevator and the like. As another example, the ERDC data may be a designation for an external feature of interest, such as an exterior common area, sidewalk or pathway around and between one or more buildings, an enclosed walkway, and the like. As further examples, the ERDC data may include a name or other descriptor of the FOI. Additionally or alternatively, the ERDC data may include an image or video (e.g., captured by a camera on the MD) of the FOI.

The memory 116 includes, among other things, verbal instruction conversion (VIC) application 126, instruction catalogue 124, instruction data 128, a navigation log 132 and one or more templates 140. The functionality of the VIC application 126 is described below in more detail. The templates 140 may include one or more types of templates that are descriptive of, and associated with, instruction object of interest. More than one type of template (e.g., images, audio signatures, gestures) may be associated with a single type of instruction object (e.g., "take the next left"). For example, image-based templates may include still or video images associated with one type of gesture-based instruction, where the images are taken from different angles, with different lighting, and at different distances from an individual providing the gesture-based instruction. As another example, multiple sets of image-based templates may be stored in connection with multiple instruction objects that are of a similar type (e.g., multiple pictures of men, women, children pointing in in a common direction). Optionally, the templates 140 may represent machine learning models that are utilized to analyze directional dialogue and identify instructions therein.

The instruction data 128 may include one or more types of instruction data based on the type of electronic device 110 that collects the instruction data. For example, cell phones and cameras may collect image-based instruction data and/or gesture-based instruction data, while cell phones, smart watches, digital personal assistance and the like collect voice-based instruction data. The VIC application 126 analyzes the directional dialogue to segment the dialogue into verbal and/or gesture-based instructions that are saved to the navigation log 132. The VIC application 126 further analyzes the verbal and gesture-based instructions, based on templates, models and the like, to identify associated navigation actions that are also saved to the navigation log 132.

During navigation, the VIC application 126 tracks movement of one or more electronic devices 110, such as based on GPS data and/or non-GPS (e.g. deadreckoning or environment related device captured data) in connection with navigation actions (saved to the navigation log 132) associated with the pathway. The VIC application 126 then manages presentation of the navigation actions through one or more of the electronic devices 110. Additionally or alternatively, the navigation log 132 may be utilized to maintain various information concerning sightings associated with points of interest along the pathway. By way of example, the navigation log 132 may maintain ERDC data, such as images and videos of a local environment surrounding the user while navigating the electronic device along the pathway. For example, when an instruction object indicates to turn right at a gas station, ERDC data collected by the electronic device during navigation may be analyzed (e.g. through image recognition) to detect images of gas stations. As another example, when an instruction object indicates to walk past a watercooler, the ER DC data collected by the electronic device during navigation may be analyzed for images of water coolers.

In the foregoing example, the electronic device 110 implements the VIC application 126 locally on a device that may be generally present within the physical area of a user. For example, the electronic device 110 may represent the user's cell phone, laptop computer, tablet device, DPA device and the like. Additionally or alternatively, all or portions of the VIC application may be implemented remotely on a remote resource, denoted in FIG. 1 as an instruction tracker 102. The instruction tracker 102 may perform limited operations, such as manage storage and creation of templates. The instruction tracker 102 may provide access to one or more memory 150, and/or implement the VIC application. The instruction tracker 102 communicates with electronic devices 110 through one or more networks 112 to provide access to instruction catalogs 152 and to implement processes described herein. The instruction tracker 102 may represent a server or other network-based computing environment. The instruction tracker 102 may represent a single computer system or a collection of computer systems located at a common location or geographically distributed.

The instruction tracker 102 includes one or more processors 104 and memory 106, among other structures that support operation of the instruction tracker 102. In accordance with embodiments herein, the instruction tracker 102 receives requests from various electronic devices 110 and returns resources in connection there with. It is recognized that the instruction tracker 102 performs other operations, not described herein, such as operations associated with maintaining resources and the like.

The memory 150 may store the instruction catalogs 152 organized in various manners and related to a wide variety of objects and types of instruction data. The instruction catalogs 152 may be organized and maintained within any manner of data sources, such as data bases, text files, data structures, libraries, relational files, flat files and the like. The instruction catalogs 152 include various types of templates corresponding to different types of objects. Optionally, the memory 150 may store instruction data 160, such as when the instruction tracker 102 receives instruction data from electronic devices 110 that are performing tracking operations. Optionally, the memory 150 may store navigation logs 162, such as in connection with frequently traveled pathways. For example, in some embodiments a remote server may be utilized as an instruction tracker 102. A local electronic device 110 may send a recording of a directional dialogue to the remote server. The remote server, when analyzing the directional dialogue may determine that one or more of the instructions has been previously analyzed and corresponds to all or a portion of a previously determined pathway. The remote server need not re-analyze the instructions, but instead may utilize a previously determined partial series of instructions and subset of navigation actions, that are returned to the requesting local electronic device, thereby reducing processing demands and increasing response time.

Figure 2:
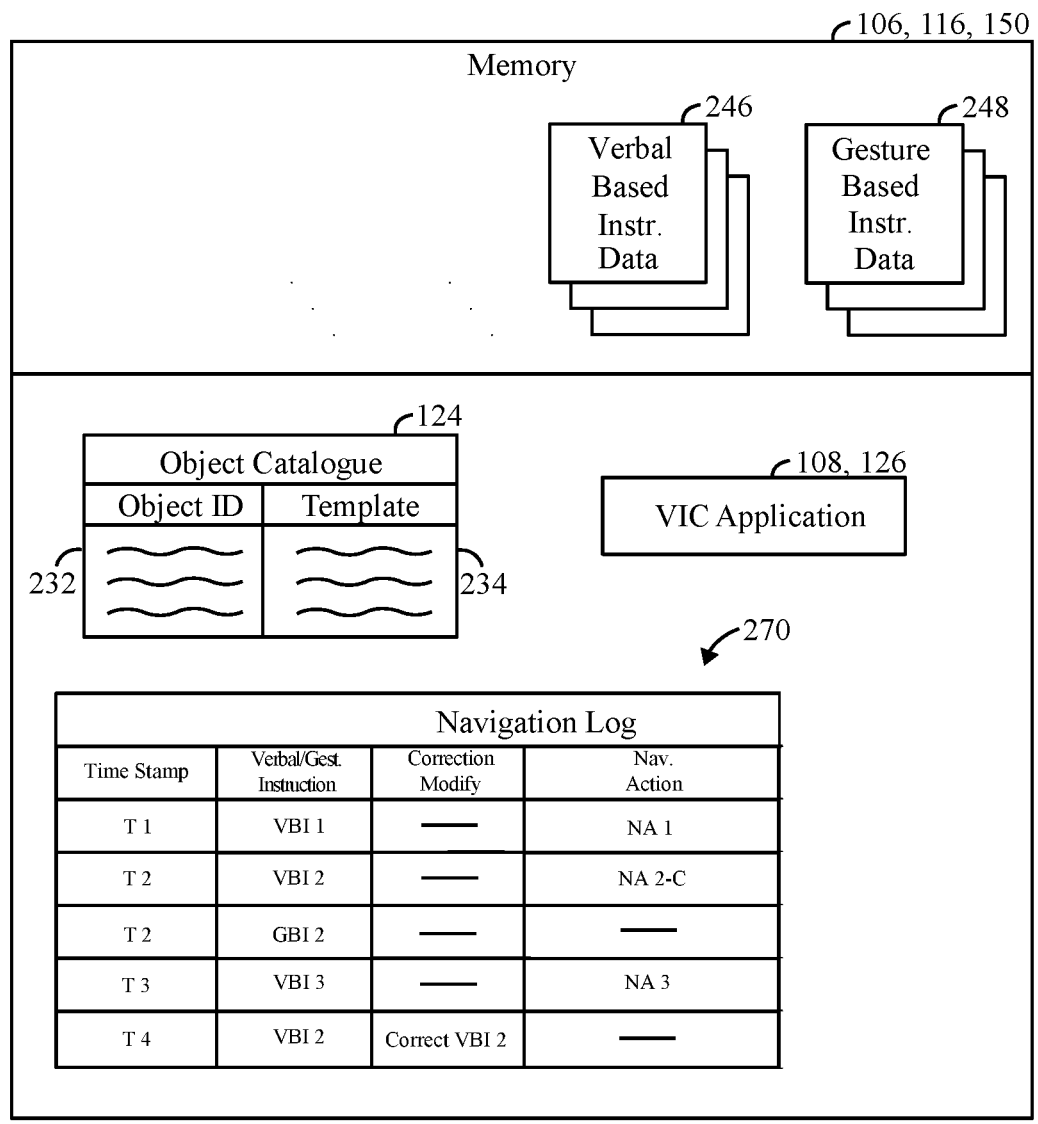
FIG. 2 illustrates a block diagram of the modules, catalogues, data and other information that may be stored within the memory in accordance with embodiments herein.

FIG. 2 illustrates a block diagram of the modules, catalogues, data and other information that may be stored within the memory 106, 116 and/or the memory 150 in accordance with embodiments herein. The VIC application 108, 126 includes program instructions accessible by the one or more processors to direct a processor to implement the methods, processes and operations described herein including, but not limited to the methods, processes and operations illustrated in the Figures and described in connection with the Figures. The VIC application 108, 126 includes one or more modules that operate in connection the various functions and features as described herein.

The memory 106, 116, 150 stores various types of instruction data (generally denoted at 128, 160), such as verbal-based instruction data 246 and gesture-based instruction data 248. The memory 106, 116, 150 also stores the instruction catalog 124 which maintains a list 232 of instruction object identifiers associated with various types of instruction objects to be identified when a third-party is providing instructions and to be converted to navigation actions, and templates 234 that may be used in connection with each type of instruction object. As explained herein, the templates 234 may be based on different types of information, such as verbal-based instructions, gesture-based instructions and the like.

The memory 106, 116, 150 may also maintain a navigation log 270 that is maintained and updated in connection with recording directional dialogue, segmenting the directional dialogue into verbal and gesture-based instructions, converting the verbal and gesture-based instructions to navigation actions, tracking movement and presenting navigation actions while navigating along a pathway through an environment. For example, the navigation log 270 may record a separate timestamp T1-T4 in connection with each instruction. An instruction may be a verbal-based instruction (VBI) or a gesture-based instruction (GBI) or a combination thereof. In the example of FIG. 2, a first verbal-based instruction (VBI1) is saved at time T1. At time T2, both a verbal-based instruction (VBI2) and a gesture-based instruction (GBI2) were recorded. At time T3, a verbal-based instruction VBI3 was recorded.

As explained herein, embodiments herein may identify verbal-based instructions that represent corrections, clarifications or modifications to a prior instruction. When a correction, clarification or modifications identified, the correction, clarification or modification is linked or tied to the original related instruction. In the example of FIG. 2, at time T4, a verbal-based instruction correction was provided correcting some aspect of the verbal-based instruction provided at time T2. Accordingly, the instruction a time T4 is linked to the verbal instruction recorded at time T2 (as denoted at "correction VBI2").

The navigation log 270 also records computer-generated navigation actions associated with the verbal and gesture-based instructions. In the example of FIG. 2, separate navigation actions NA1 and NA3 are generated based on the corresponding verbal-based instructions VBI1 and VBI3. At time T2, a combination of verbal and gesture-based instructions VBI2 and GBI2 were provided and thus are combined as a single navigation action NA2. The combination of verbal based instruction VBI2 and gesture-based instruction GBI2 collectively define a single navigation action NA2. The navigation action NA2 is subsequently corrected at time T4, and thus represents a corrected navigation action, as denoted at NA2-C.

Figure 3:
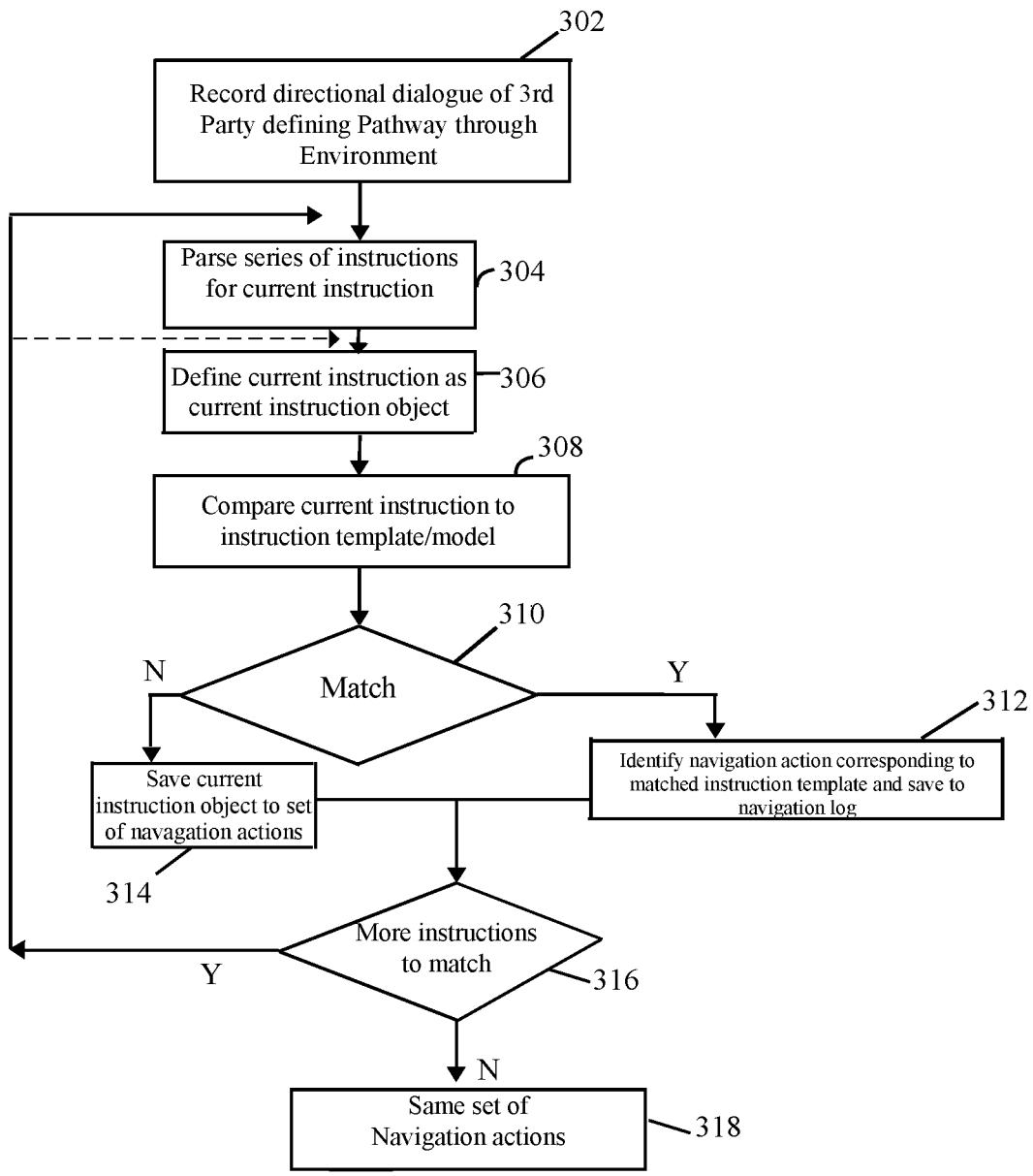
FIG. 3 illustrates a process for recording a directional dialogue that includes a series of instructions provided by one or more third parties, where the series of instructions at least partially defines a pathway through an environment.

FIG. 3 illustrates a process for recording a directional dialogue that includes a series of instructions provided by one or more third-parties, where the series of instructions at least partially defines a pathway through an environment. The operations of FIG. 3 may be implemented by a single electronic device, by a combination of electronic devices, and/or entirely or partially by a remote server. For example, a single electronic device or a group of two or more electronic devices may record a directional dialogue that includes verbal and/or gesture-based instructions. The same single electronic device and/or group of two or more electronic devices may then analyze the directional dialogue to identify the series of instructions and then form a corresponding set of navigation actions. Additionally or alternatively, the analysis may be performed entirely or partially by a remote server. For example, a first electronic device may collect the directional dialogue and pass it to a second electronic device and/or remote server for conversion. The second electronic device and/or remote server then returns a corresponding set of navigation actions to the first electronic device and/or a third electronic device.

At 302, one or more processors obtain a directional dialogue comprising a set of instructions that at least partially define a pathway through an environment. For example, a smart phone or other electronic device (ED) may record an audio recording and/or a video recording of all or a portion of a one-way or two-way dialogue between an individual using the ED (ED user) and one or more other persons (3rd party). The audio and/or video recordings may be initiated automatically by an electronic device when the electronic device "hears" one of various predetermined questions, commands, words and the like from the ED user (e.g., "How do it get to . . . ", "Nav App Start Recording Directions"). Additionally or alternatively, the ED user may enter a command, open an application on the ED or otherwise instruct the ED to begin recording. The directional dialogue may represent a one-way dialogue that comprises only statements by the third-party, without any intervening comments or questions by the ED user. Alternatively, the directional dialogue may represent a two-way dialogue that comprises statements by both the third-party and the ED user. For example, while the third-party is giving directions, the ED user may restate individual instructions and/or ask questions. The directional dialogue may comprise verbal instructions by the third-party, alone or in combination with gesture-based instructions (e.g. pointing in particular directions, indicating turn actions with his/her hands, pointing at landmarks within sight and the like).

A non-limiting example of a two-way directional dialogue formed from a verbal exchange between the ED user and a third party may include an exchange of questions and answers as follows:

MD User: "Where is Cate's office?"
3rd Party: "Go down this hallway and turn left at that hallway, 3rd door on the right"
MD User: "Go down the hall behind me?"
3rd Party: "yes"
MD User: "Turn take the second left?"
3rd Party: "yes"

As one nonlimiting example, the one or more processors analyze the exchange and derive navigation actions, such as a) travel south until reaching second hallway to the left relative to the direction of travel, b) turn left at the second hallway, c) travel until reaching 3rd door after left turn. The foregoing example is a verbal directional dialogue. Additionally or alternatively, the directional dialogue may only include gestures, or alternatively the directional dialogue may include a combination of verbal and gesture-based instructions.

At 304, the one or more processors begin parsing through the audio and/or video recordings of the directional dialogue to identify a first or current instruction within the set of instructions. For example, the parsing operation may separate the dialogue into a series of statements or conversation segments. Additionally or alternatively, the parsing operation may search for keywords or phrases commonly associated with individual verbal instructions. For example, the directional dialogue may be separated into verbal turn instructions, such as "walk 2 blocks and turn left", "drive 1 mile and take a right at the stop sign", "go down the hallway and take the second left", "take the elevator to the 3rd floor", "when you get off the elevator turn right down the hallway", "turn left at the water cooler", "go past the cubicle with the Wisconsin Badgers banner and turn left", etc. The verbal instructions may be statements by one or more third parties who are not the ED user. Optionally, the one or more processors may search for predefined keywords or phrases by the ED user that represent instruction markers to differentiate a separation between successive instructions. For example, the ED user may provide verbal demarcations between instructions (e.g. "okay, what is the next turn", "Then what", "action 1", "action 2"). Optionally, the one or more processors may use each statement by the ED user as a distinction between individual verbal instructions, such as each time the ED user asks questions, restates portions of the verbal instructions and the like.

Optionally, the one or more processors may compare the directional dialogue to one or more templates to identify words, phrases, or statements within the dialogue that exhibit some level of correlation or match to words, phrases or statements in the templates. Statements that partially or wholly match templates may be separated as a discrete verbal instruction. Optionally, a level of correlation may be derived from a count of the number of words in a third party statement that match words in a single instruction template.

Optionally, the one or more processors may utilize machine learning to develop models that parse through the directional dialogue and identify sets of instructions therein. Different models may be used for different types of directional dialogue. The models may be built over time by dialogue collected by a single ED. Additionally or alternatively, the models may be built over time by a remote server that receives larger volumes of recorded directional dialogues from a large population of electronic devices. When a remote server builds or updates models that are able to parse through directional dialog, the remote server may periodically download current versions of the models to various electronic devices for local real-time use. As non-limiting examples, different models may be used for different environments, such as a first model for internal navigation of a building, a second model for navigation through a medical, college or other campus of buildings, a third model for navigation through city streets, a fourth model to navigate highways, a fifth model to navigate rural, dirt roads, a sixth model to navigate hiking trails, etc.

When gestures are included within the directional dialog, the one or more processors, at 304, parse through still or video data recording the gestures to identify a current gesture-based instruction. As one example, a current/first instruction may represent a verbal only instruction, while the next/second successive instruction may represent a gesture only instruction, while the next/third instruction may represent a combination of a verbal and gesture-based instruction. When video data is recordings, the one or more processors parse through the video recording in parallel with the audio recording. Time stamps may be used to temporally correlate segments of the audio recording and the video recording with one another. At each iteration through the operation at 304, the one or more processors parse through the audio data collected in connection with the verbal directional dialogue and the image/video data collected in connection with the gesture directional dialogue. In connection with a single instruction, a corresponding segment of the video data may be blank or not relevant. In connection with a single instruction, a corresponding segment of the audio data may be blank or not relevant.

In accordance with the foregoing embodiments, the ED may also collect image or video data related to hand gestures, arm movements, head facing direction of the 3rd party providing the instructions. The one or more processors may then analyze the image or video data in combination with the verbal directional dialogue to derive the verbal instructions. For example, a 3rd party may say "Go that direction 1 mile", while facing or pointing East. The 3rd party may then say "Turn that direction" while facing or pointing North.

In the present example, once a current verbal based instruction, gesture-based instruction or combined verbal/gesture-based instruction is identified, flow moves on to the next operation of FIG. 3, at 306, as discussed hereafter. Alternatively, the one or more processors may parse through the entire directional dialogue to identify each of the separate verbal-based instructions, gesture-based instructions and/or combined verbal/gesture-based instructions within the complete directional dialogue exchange before flow moves onto 306. Alternatively, the one or more processors may parse through a segment of the directional dialogue (e.g., first one-third, first 5 minutes, etc.) to identify a subset of the verbal-based instructions, gesture-based instructions and/or combined verbal/gesture-based instructions before flow moves onto 306. In some instances, it may be desirable to parse all or a subset of the instructions at one point in time, to detect corrections, clarifications or other modifications to earlier instructions. For example, the first instruction may be to "take the first hallway on the left", but the third instruction is "No wait, do not take the first hallway on the left. Instead, take the second hallway on the left." An example of a clarification may be that in the first minute of the dialogue, the third party states "Go 1 mile and then turn right at the stop sign", but then later in the dialogue, the third party modifies the instruction by saying "Oh when I said to turn at the stop sign, I think they put in a street light at that intersection", or the third party clarifies the instruction by saying "it may not be exactly a mile to the right turn, but I'm sure you turn right at the next gas station up the road around 1 mile."

At 306, the one or more processors define the current instruction as a unique current instruction object and save the current instruction object on the navigation log, along with a time stamp relative to a reference time (e.g., beginning) for the recording(s) of the directional dialogue. When the entire directional dialogue is analyzed at 304, at 306, the one or more processors define separate instructional objects for each verbal based instruction, for each gesture-based instruction and for each combined verbal/gesture-based instruction. The one or more processors use the time stamps to match different types of instructions from different recording sources (e.g., matching a hand gesture in the video data with a verbal statement from the audio data).

Optionally, at 306, the one or more processors may review the current instruction object to determine whether the current instruction object is a "new" or "next" instruction or instead is a correction, modification or clarification of an earlier instruction. For example, the content of the current instruction object may be compared to the content of earlier instruction objects. When a sufficient correlation or match is identified, the one or more processors may declare the current instruction object to be a correction, modification or clarification of an earlier instruction, and update the log accordingly. For example, the correction, modification or clarification may be stored in a linking manner with the earlier instruction, may replace the earlier instruction and the like.

At 308, the one or more processors compare a current instruction object to one or more instruction templates. The comparison may compare all available instruction templates to the current instruction object. Alternatively, the one or more processors may implement a more selective process to choose a subset of the instruction templates for comparison. For example, a type, nature or other aspect of the current instruction object may be utilized to select a related subset of instruction templates. For example, when certain words are identified within a current instruction object, templates having the same words may be chosen. Additionally or alternatively, a subset of the instruction templates may be chosen based on the overall nature of the directional dialogue (e.g. the dialect of the third-party providing the directional dialog, an environment containing the pathway and the like). For example, when the environment concerns the interior of an office building, a subset of instructional templates may be utilized that relate to office building instructions. Alternatively, when the environment concerns streets of a city, highways, or gravel roads in a rural area, a corresponding subset of instructional templates may be chosen.

Additionally or alternatively, when the current instruction object relates to a gesture-based instruction, a corresponding subset of gesture-based instruction templates are chosen for comparison. All or a subset of the available gesture-based instruction temples may be utilized. For example, when the current instruction object relates to hand gestures, the subset of gesture-based instruction templates including hand gestures may be chosen. Optionally, the subset of instruction templates may be based on the type of ED that collected the corresponding instruction (e.g., smartphone templates, smart watch templates, augmented reality glasses templates, etc.).

At 310, the one or more processors determine whether the current instruction object matches one of the instruction templates. A match may be defined in terms of a binary determination, namely the current instruction object either matches or does not match the instruction template. For example, the analysis may step through a list of options/templates (e.g., "Turn left—NO", "Turn right—NO", "Go to the X hallway—Yes", "walk Y blocks—yes"). Alternatively, the current instruction object may at least partially match multiple instruction templates, in which case the resulting match may be defined as the instruction template that exhibits a desired level (e.g. best) of correlation to the current instruction object.

When a match is identified at 310, flow moves to 312. When a match is not identified, flow moves to 314. At 312, the one or more processors review the matching instructional template to identify a navigation action related thereto. Each instructional template may include or be linked to one or more navigation actions. When a matched identified, the corresponding navigation action is identified at 312, and the navigation action is added to the navigation log. The navigation actions obtained from instructional templates are computer generated and differ from the original audio/video recording of the third party.

Returning to 310, when flow moves to 314, and no match is identified, the one or more processors may save the current instruction object directly as the navigation action. For example, when a segment of it audio recording during the directional dialogue cannot be matched to a particular instruction template, the underlying segment of the audio recording may be stored directly as the navigation action in the navigation log. During navigation, when movement is tracked to a present location along the pathway that corresponds to the audio recording segment, the audio recording segment may be replayed to the ED user. As a gesture-based example, when a segment of an image/video recording during the directional dialogue cannot be matched to a particular instruction template, the image and/or video recording segment may be saved within the navigation log as the corresponding navigation action. Similarly, during navigation when movement is tracked to a present location along the pathway that corresponds to the video recording segment and/or image, the video recording segment and/or image are displayed to the ED user.

Next, at 316, the one or more processors determine whether the entire directional dialogue has been parsed or alternatively whether additional instructions remain to be analyzed. When additional instructions remain to be analyzed, flow returns to either 304 or 306. When flow returns to 304, the parsing operation continues to the next instruction within the directional dialogue. When flow returns to 306 (e.g. when all of the instructions are already parsed), the next/current instruction object is selected for comparison to instructional templates. The operations at 304, 306 to 316 are iteratively performed until the series of instructions within the directional dialogue are analyzed and converted to a set of navigation actions.

At 318, the one or more processors save the set of navigation actions to the navigation log for current or future use. The operations of FIG. 3 may be implemented before a user begins moving along a pathway associated with the directional dialogue. Alternatively, the operations of FIG. 3 may be implemented in parallel with movement of the user and electronic device along the pathway, in which case individual instructions may be analyzed and converted to navigation actions in real time and substantially contemporaneous with movement of the electronic device along the pathway.

Figure 4:
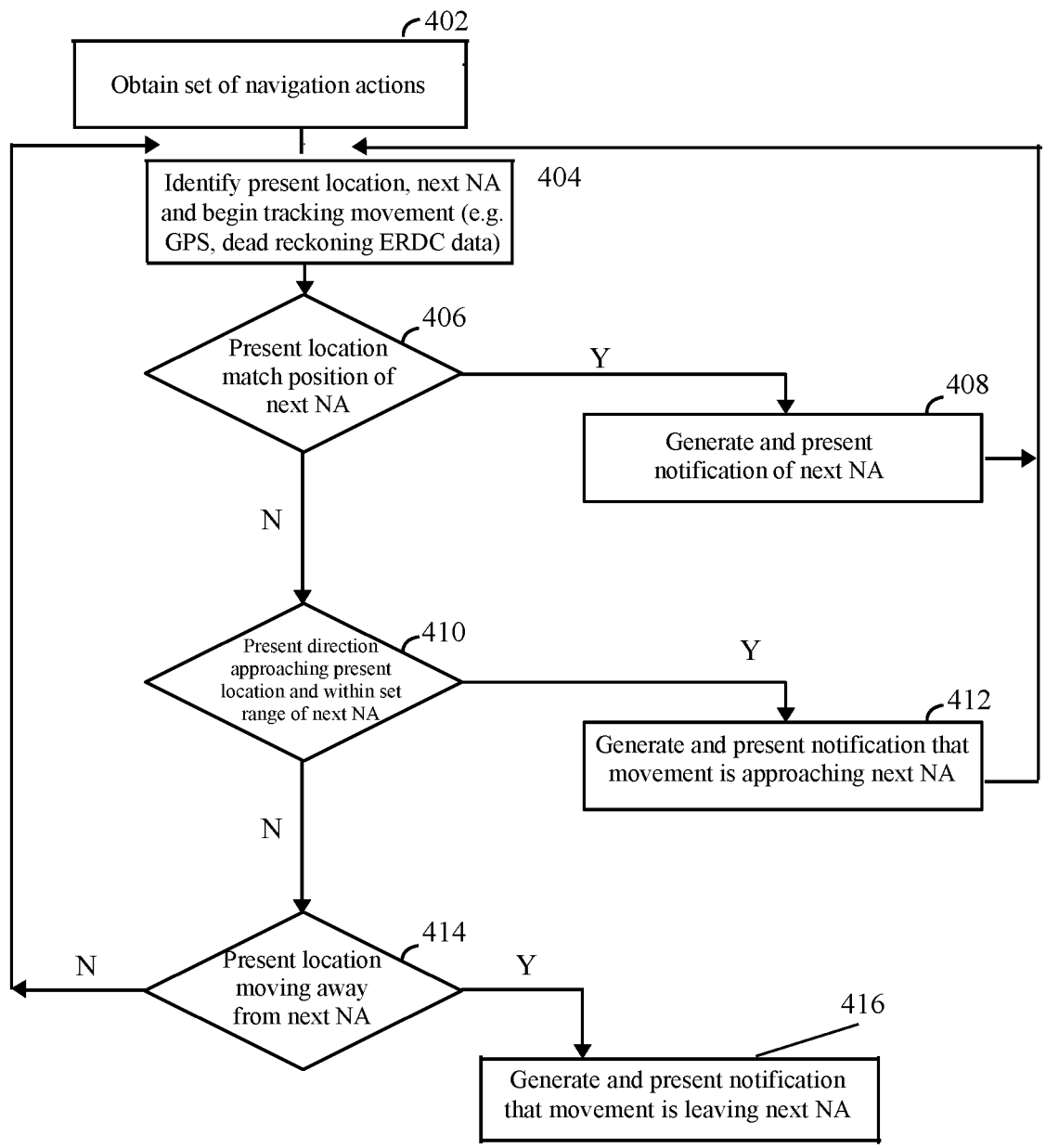
FIG. 4 illustrates a process for tracking movement and presenting navigation actions in accordance with embodiments herein.

FIG. 4 illustrates a process for tracking movement and presenting navigation actions in accordance with embodiments herein. At 402, the one or more processors obtain a set of navigation actions from the navigation log which were previously generated as described above in connection with FIG. 3. When a complete set of navigation actions is safe to the navigation log, the complete set may be obtained at 402. Alternatively, the process of FIG. 4 may be implemented before completion of the conversion process of FIG. 3, and thus the navigation log may not yet have a complete set of navigation actions when the process of FIG. 4 is initiated. For example, the electronic device may begin moving along the pathway as soon as the third-party completes the directional dialogue. Accordingly, navigation may begin contemporaneous with the analysis and conversion of the directional dialogue. Accordingly, the one or more processors may simply obtain the first or next navigation action (or a subset of navigation actions).

At 404, the one or more processors identify a present location of the electronic device, as well as the next navigation action (NA). The one or more processors begin tracking movement of the electronic device at 404 as well. Movement information may be collected in various manners, and movement may be tracked in various manners. For example, when the electronic device has GPS tracking capabilities and communicates with a GPS network, the electronic device may track movement based on movement information corresponding to GPS data. Additionally or alternatively, the electronic device may utilize non-GPS data as the movement information, such as through a dead reckoning process that utilizes one or more directional/orientation sensors within the electronic device. The sensors monitor movement and changes in direction/orientation experienced by the electronic device. Based on the changes in direction and orientation, the electronic device utilizes dead reckoning to approximate rate and direction of movement.

Additionally or alternatively, the electronic device may collect, as non-GPS movement information, environment related device captured data. For example, the ERDC data may include images or video captured by one or more cameras within the electronic device as a user moves with the electronic device. As another example, the ERDC data may correspond to Wi-Fi node identifiers detected by the wireless communications components of the electronic device. Based on one or more of the GPS data or non-GPS data, the one or more processors track movement and continuously determine a present location of the electronic device.

At 406, the one or more processors determine whether the present location corresponds to (e.g. matches) a position of a next navigation action. For example, when a navigation action represents taking a right or left turn at a hallway within a building, at 406, the one or more processors may determine that the present location corresponds to the navigation action when the present location represents an intersection with the hallway that was designated during the directional dialogue. Additionally or alternatively, when a navigation action represents traveling a defined distance in a particular direction (e.g. 100 yards south), at 406, the one or more processors may determine that the electronic device has completed the navigation action when the movement information indicates that the electronic device has traveled the 100 yards in the designated direction.

When the present location corresponds to a position associated with the next navigation action, flow moves to 408. At 408, the one or more processors generate and present a notification of the next navigation action. The presentation of the notification may include displaying the notification on the electronic device, providing an audio instruction corresponding to the navigation action and/or providing a tactile instruction indicative of the navigation action. Additionally or alternatively, the notification may be presented on another electronic device that is currently being utilized by the user and that is in communication with the electronic device that is tracking the movement and rendering the determination at 406. For example, a smart phone may be utilized to track movement through GPS, dead reckoning and/or collection and analysis of ER DC data, while a smart watch, augmented reality glasses or other wearable is used to present the notification of the next navigation action. Thereafter, flow returns to 404 where the movement is further tracked in connection with the next navigation action.

Returning to 406, when the present location does not match the position of the next navigation action, flow moves to 410. At 410, the one or more processors determine whether the movement information indicates that the electronic device is moving in a direction that is approaching a location associated with a next navigation action. At 406, when the electronic device is moving toward a location associated with a next navigation action, the one or more processors also determines whether the present location is within a set or predetermined range relative to the position associated with the next navigation action. When the present location is within the set range and the direction of movement is approaching the next navigation action, flow moves to 412. At 412, the one or more processors generate and present a notification that movement is approaching the next navigation action. For example, the notification may indicate that the next navigation action will occur in X feet, Y miles, Z minutes and the like. Thereafter, flow returns to 404 where the process continues to track movement in connection with a current navigation action. When flow moves from 412 to 404, the electronic device has not yet reached the location associated with the next navigation action and thus a new navigation action is not yet identified.

Returning to 410, when one or both of the decisions at 410 is not true, flow moves to 414. For example, flow may move from 410 to 414 when the direction of movement by the electronic device is away from the location associated with the next navigation action. Additionally or alternatively, the process flow may move from 410 to 414 when the present location is not yet within the set range relative to the location of the next navigation action.

At 414, the one or more processors determine whether the present direction is moving away from a location associated with a next navigation action. For example, the condition at 414 may become true when the user takes a wrong turn and/or unexpectedly diverts from the pathway defined by the set of navigation actions. When the direction of movement is not away from the next navigation action, flow returns to 404.

Alternatively, when the direction of movement is away from the next navigation action, flow moves to 416. At 416, the one or more processors generate and present a notification that the movement is moving away from the next navigation action. Additionally or alternatively, at 416, the notification may include additional information to assist in rerouting to the correct pathway and/or initiate a calculation of a new pathway (e.g. to reassess the conversion of one or more of the verbal and/or gesture-based instructions to a navigation action). For example, the notification may indicate that a user has taken a wrong turn and should backtrack to a prior hallway intersection and go in the opposite direction.

The foregoing example assumes that the ED user understands what the 3rd party is saying. Additionally or alternatively, embodiments herein are not limited to the ED user and the third-party understanding one another. For example, the ED user may not speak the same language or same local dialect as the 3rd party. Accordingly, the one or more processors may analyze statements by a 3rd party that the ED user does not understand. The one or more processors may utilize various language translators to understand the statements by the 3rd party. The navigation actions may be presented audibly as spoken statements in a language that the ED user understands (e.g., translating travel instructions from French, Italian, etc., to English).

Additionally or alternatively, embodiments herein may be utilized to support an ED user who may be hearing and/or speech impaired. The ED user may convey a request for directions to the 3rd party in various manners. In response thereto, the ED user may not hear/understand the directional dialogue provided by the 3rd party. However, the one or more processors convert the directional dialogue instruction objects as described herein, determine navigation actions associated with each verbal and/or gesture-based instruction, and present the navigation actions to the ED user in a manner that the ED user is able to understand. For example, for a hearing-impaired person, the navigation actions may be presented visually and/or tactilely. For a blind person, the navigation actions may be presented verbally and/or tactile (e.g., slow vibrating means continue walking straight, medium speed vibrations mean turn left, fast vibrations mean turn right) or audibly. Optionally, the ED may convey the navigation instructions through Morris Code, Braille or other predefined audible, tactile or visual code.

Closing Statements

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the Figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Further, in the following claims, the phrases "at least A or B", "A and/or B", and "one or more of A and B" (where "A" and "B" represent claim elements), are used to encompass i) A, ii) B and/or iii) both A and B.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A computer implemented method, comprising:
    under the direction of one or more processors,
    obtaining a directional dialogue provided by a third party to a user of a portable first electronic device (ED), the directional dialogue comprising a series of instructions that at least partially defines a pathway for the user to follow through an environment;
    determining navigation actions associated with the pathway for the user to follow based on the series of instructions;
    tracking movement of the first ED based on one or more of GPS data and non-GPS data; and
    presenting the navigation actions based on the movement.

2. The method of claim 1, wherein the determining comprises identifying a present location of the user along the pathway based on the movement of the first ED and, based on the present location, identifying a corresponding one of the navigation actions.

3. The method of claim 1, wherein the obtaining comprises recording the directional dialogue as an audio recording and parsing the audio recording to identify segments associated with verbal instructions that at least partially define the pathway for the user to follow.

4. The method of claim 1, wherein the obtaining comprises recording the directional dialogue as a video recording and parsing the video recording to identify segments associated with gesture-based instructions that at least partially define the pathway for the user to follow.

5. The method of claim 1, wherein the obtaining comprises recording the directional dialogue as audio and video recordings, parsing the audio and video recordings to identify segments associated with verbal and gesture-based instructions, identifying a combination of a verbal based instruction and a gesture-based instruction that collectively define a single navigation action.

6. The method of claim 1, wherein the determining the navigation actions further comprises comparing one or more of verbal and gesture-based instructions in the directional dialogue to one or more of a template and a machine learning-based model to identify the corresponding navigation action.

7. The method of claim 1, wherein the directional dialogue comprises verbal statements corresponding to the series of instructions, the presenting comprises replaying a select one of the verbal statements as the navigation action.

8. The method of claim 1, wherein the presenting comprises displaying an augmented reality view of the environment in combination with one or more of an audible, visual and tactile output indicative of the navigation action.

9. The method of claim 1, wherein the tracking comprises one or more of:
   a) collecting the GPS data indicative of a present location of the ED and analyzing the GPS data with respect to when to present the corresponding navigation action; and
   b) collecting ERDC data from the ED indicative of a feature of interest from the environment and analyzing the ERDC data with respect to when to present the corresponding navigation action.

10. A system, comprising:
   a first electronic device (ED) configured to be portable, the first ED comprising: a user interface that includes an input configured to obtain a directional dialogue provided by a third party to a user of the first ED, the directional dialogue comprising a series of instructions that at least partially defines a pathway for the user to follow through an environment;
   a processor;
   a memory storing program instructions accessible by the processor, wherein, responsive to execution of the program instructions, the processor to perform the following:
      determine navigation actions associated with the pathway for the user to follow based on the series of instructions; and
      track movement of) the first ED based on one or more of GPS data and non-GPS data; and
      the user interface of the first ED configured to present the navigation actions based on the movement.

11. The system of claim 10, wherein, responsive to execution of the program instructions, the processor to identify a present location of the user along the pathway based on the movement of the first ED and, based on the present location, identify a corresponding one of the navigation actions.

12. The system of claim 10, wherein, responsive to execution of the program instructions, the processor to record the directional dialogue as an audio recording and parsing the audio recording to identify segments associated with verbal instructions that at least partially define the pathway for the user to follow, the processor housed within at least one of the first ED, a second ED or a remote server.

13. The system of claim 10, wherein, responsive to execution of the program instructions, the processor to record the directional dialogue as a video recording and parsing the video recording to identify segments associated with gesture-based instructions that at least partially define the pathway for the user to follow, the processor housed within at least one of the first ED, a second ED or a remote server.

14. The system of claim 10, wherein, responsive to execution of the program instructions, the processor to record the directional dialogue as audio and video recordings, parsing the audio and video recordings to identify segments associated with verbal and gesture-based instructions, identifying a combination of a verbal based instruction and a gesture-based instruction that collectively define a single navigation action, the processor housed within at least one of the first ED, a second ED or a remote server.

15. The system of claim 10, wherein, responsive to execution of the program instructions, the processor to determine the navigation actions by comparing one or more of verbal and gesture-based instructions in the directional dialogue to one or more of a template and a machine learning-based model to identify the corresponding navigation action.

16. The system of claim 10, wherein the user interface of the first ED includes one or more of a microphone and camera that, under direction of a first processor, obtains the directional dialogue, the system further comprising one or more of a second ED and a remote server, having a second processor, to perform one or more of the determining the navigation actions and tracking the movement.

17. A computer program product comprising a non-signal computer readable storage medium comprising computer executable code to perform:
   obtaining a directional dialogue provided by a third party to a user of a portable first electronic device (ED), the directional dialogue comprising a series of instructions that at least partially defines a pathway for the user to follow through an environment;
   determining navigation actions associated with the pathway for the user to follow based on the series of instructions;
   tracking movement of the first ED based on one or more of GPS data and non-GPS data; and
   presenting the navigation actions, at a user interface of the first ED, based on the movement.

18. The computer program product of claim 17, wherein the determining comprises identifying a present location of the user along the pathway based on the movement of the first ED and, based on the present location, identifying a corresponding one of the navigation actions.

19. The computer program product of claim 17, further comprising a navigation log to record timestamps, verbal-based instructions, gesture-based instructions, and navigation actions associated with the verbal-based instructions and gesture-based instructions.

* * * * *